(No Model.)
H. F. PARSHALL.
METHOD OF REGULATING SPEED OF SERIES ELECTRIC MOTORS.
No. 597,018. Patented Jan. 11, 1898.
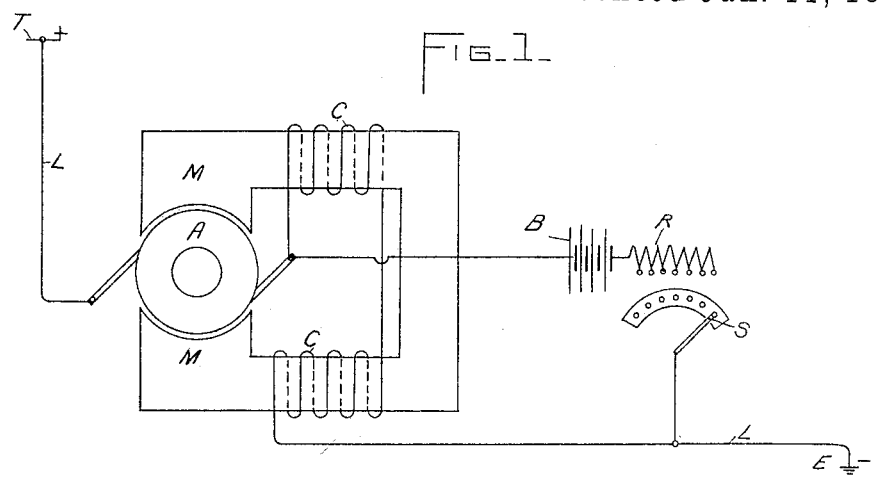
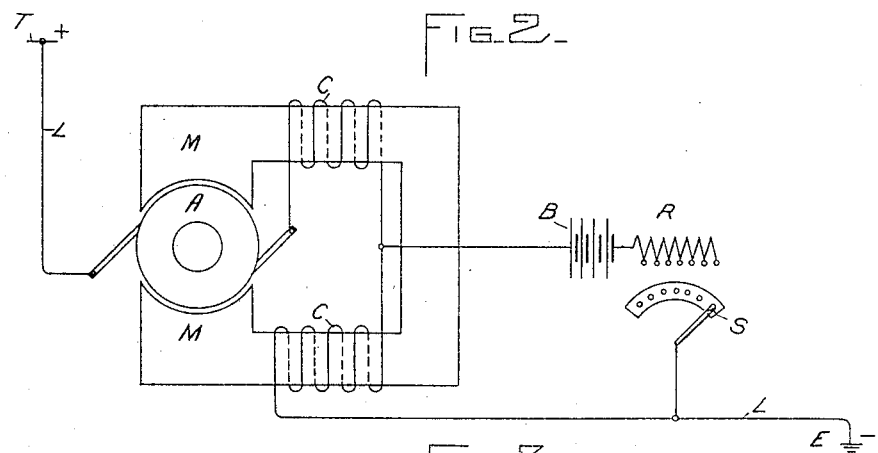
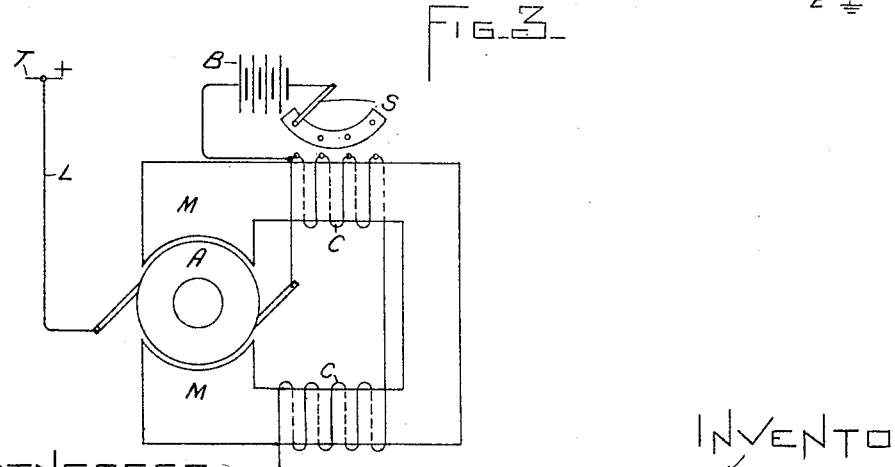

UNITED STATES PATENT OFFICE.

HORACE F. PARSHALL, OF LONDON, ENGLAND.

METHOD OF REGULATING SPEED OF SERIES ELECTRIC MOTORS.

SPECIFICATION forming part of Letters Patent No. 597,018, dated January 11, 1898.

Application filed April 5, 1897. Serial No. 630,734. (No model.)

*To all whom it may concern:*

Be it known that I, HORACE FIELD PARSHALL, a citizen of the United States, and a resident of 83 Cannon Street, in the city of London, England, have invented a certain new and useful Improved Method of Regulating the Speed of Series Electric Motors, of which the following is a specification.

My invention relates to the regulation of the speed of series motors, particularly in electric traction, and has for its object to secure the known advantages of a series motor in starting, accelerating, or retarding the speed of a load, such as a tram-car—that is, to make the effort per ampere a maximum, but at the same time to gain the advantages of a shunt-motor, so that the maximum speed of the motor may be automatically restricted and limited as required and the motor cannot race when unloaded.

It is well known that the current intake of a series motor is approximately inversely proportional to its speed when the fields are not saturated. Thus at low speeds the current intake is comparatively great and at high speeds comparatively small. The difference of potential on the terminals of the series coil is directly proportional to the amount of current flowing into the motor, and consequently inversely proportional to the speed of the motor. If therefore a storage battery or equivalent source of electromotive force be connected in shunt to this series coil, owing to the difference of potential at the terminals of the series coil, with heavy loads current will be flowing into the storage battery or equivalent, and with light loads, owing to the diminished potential at the terminals of the series coil, current will flow from the storage battery through the series coil. Thus the tendency of such an arrangement is to maintain constant current in the field-coil of a series motor and therefore to maintain a practically constant speed. According to my invention therefore I place a storage battery or other equivalent acting electromotive force in shunt either to the whole or to a part of the field-coil of a series motor, and in order to maintain the advantages of a series motor I may use also a resistance (variable or not) in series with the said battery and so applied that the greatest possible proportion of the current flows through the series coil at heavy loads, while the discharge through the series coil is restricted by some predetermined amount at light load, owing to the greater electromotive force required to charge the secondary battery than that given out in its discharge. This also tends to make the action of the motor in starting that of a series motor. In electric-traction practice where the speed is to be limited to a prearranged maximum preferably batteries of high internal resistance are used, so that the difference in voltage as between charging and discharging becomes considerable, in which case for a given maximum speed the amount of current shunted from the fields in starting becomes a minimum. This action is obviously augmented by the use of a resistance in series with the storage battery. When the speed is to be maintained constant over any considerable range of load, batteries of minimum internal resistance and with no external resistance are preferably used.

In further description of my invention I will refer to the accompanying drawings, in which the figures diagrammatically represent three ways of carrying out my invention.

In all the figures, A is the armature of a series-wound motor, and M the field-magnet. Current passes through line L from the trolley T or other source of electrical energy through the armature and the field-coil C to earth at E.

B is a storage battery, R a resistance, and S a variable switch.

In Fig. 1 the battery B is in shunt to the whole of the series field-coil, the switch S acting to vary the resistance R.

In Fig. 2 the battery is in shunt to a part only of the series field-coil.

In Fig. 3 the resistance R is omitted and the battery is placed in shunt to part of the series coil, the variable switch S acting upon some of the coils.

Since the electromotive force in the coil C varies with the current and speed of the motor, at low speeds the battery B is charged and at high speeds—that is, when the prearranged maximum is exceeded—the battery supplies current to strengthen the field and retard the motor and so maintain a constant rate of speed, which is varying as required by means of the switch S.

I would state that I am well aware that a primary battery of high resistance might accomplish is some degree the same result as the storage battery above referred to. Therefore I do not limit myself to the use of a storage battery.

Having now described my invention, what I claim as new, and desire to secure by Letters Patent, is—

1. The art of regulating the speed and torque of a series electric motor, which consists in shunting the field-coils of the motor by a source of electromotive force, imparting energy from the line to the source of electromotive force when the current is large, and taking energy therefrom to maintain the field when the line-current is cut down by the counter electromotive force of the motor.

2. The art of regulating the speed and torque of a series electric motor, which consists in shunting the field-coils of the motor by a source of electromotive force opposed to that of the line, supplying such source with energy from the line when the current is large and automatically returning the supplied energy to strengthen the field when the line-current is cut down by the counter electromotive force of the motor.

3. In a series motor, a line-circuit supplying the motor with current at constant potential, and a source of electromotive force opposed to that of the line, in shunt to the field-magnet circuit of the motor.

4. A series motor, a line-circuit supplying the motor with current at constant potential, a source of electromotive force opposed to that of the line in shunt to the field-magnet circuit of the motor, and a resistance in series with the source of electromotive force and in shunt to the field-coil.

5. A series motor, a source of current of constant potential for the motor, a storage battery in shunt to the field-circuit of the motor, and a variable resistance in series with the storage battery included in the shunt.

In witness whereof I have hereunto set my hand in the presence of two witnesses.

HORACE F. PARSHALL.

Witnesses:
JOSEPH C. CHAPMAN,
WALTER I. SKERTEN.